United States Patent [19]

Stauffer

[11] Patent Number: 4,716,430
[45] Date of Patent: Dec. 29, 1987

[54] PULSE PROXIMITY DETECTION

[75] Inventor: Norman L. Stauffer, Englewood, Colo.

[73] Assignee: Honeywell Inc., Minneapolis, Minn.

[21] Appl. No.: 926,756

[22] Filed: Nov. 4, 1986

[51] Int. Cl.⁴ .......................... G03B 3/00; G01C 3/08
[52] U.S. Cl. ........................................ 354/403; 356/4
[58] Field of Search .................. 354/403, 415; 356/1, 356/4

[56] References Cited
U.S. PATENT DOCUMENTS
3,937,574  2/1976  Peckham ........................... 356/4

Primary Examiner—W. B. Perkey
Attorney, Agent, or Firm—Charles J. Ungemach

[57] ABSTRACT

A device for measuring the distance to a surface comprising a pulsed energy emitting source positioned to direct energy to the remote surface and first and second energy responsive detectors to receive energy reflected from the surface with the detectors being arranged at different distances so that the output of the detectors can be compared to produce a resultant which is indicative of the distance to the surface.

27 Claims, 5 Drawing Figures

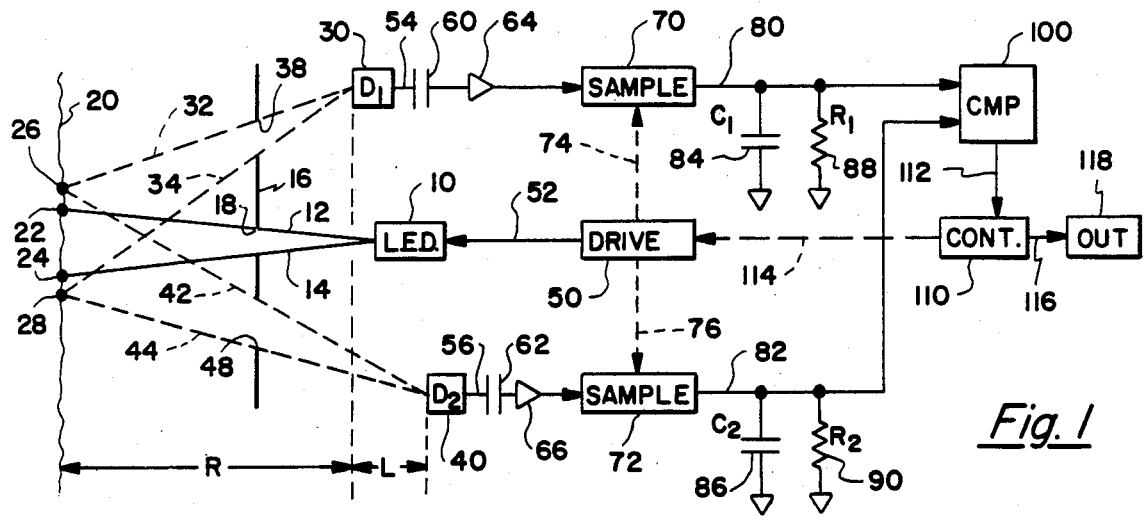
*Fig. 1*
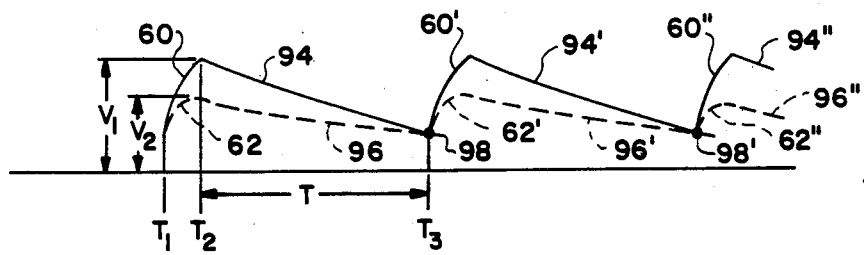
*Fig. 2*
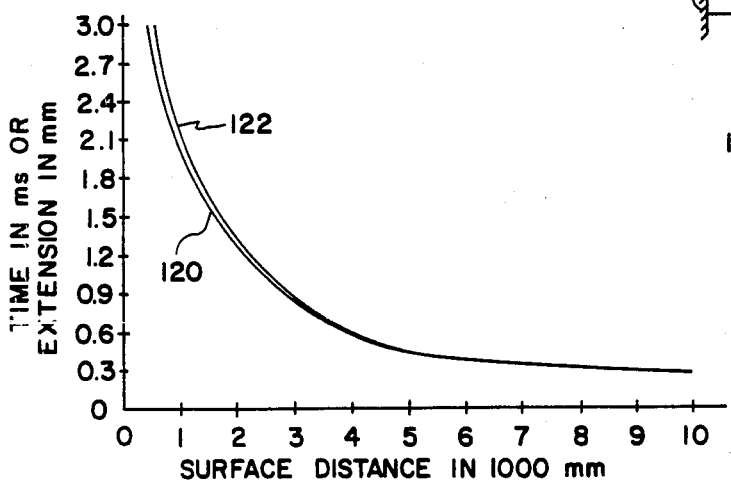
*Fig. 3*
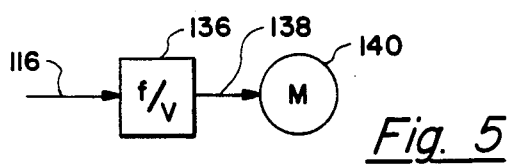
*Fig. 4*
*Fig. 5*

4,716,430

PULSE PROXIMITY DETECTION

BACKGROUND OF THE INVENTION

In my co-pending application Ser. No. 883,289, filed July 7, 1986, as a Continuation-In-Part of application Ser. No. 767,949, filed Aug. 21, 1985, I describe an optical proximity sensor which is useful in determining the distance to a surface or an object without actually touching the surface or object itself. Such devices are useful in process controls as well as in photography to determine the distance to a remote object.

In one embodiment of the above-mentioned co-pending application, two energy emitting sources such as light emitting diodes are mounted to project light onto the remote surface from two slightly different distances away therefrom. Energy reflected from the surface is detected to produce a resultant output signal in accordance with the flux received. In this case, the two energy transmitters are modulated at a different phase angle and it is shown therein that the phase of the output signal produced by the detector is related to the distance to the remote surface. In a second embodiment a single energy emitting source is utilized to direct energy to the remote surface and two detectors situated at different distances from the remote surface receive the reflected energy. The output of one of these detectors is phase shifted with respect to the other to produce a resultant output signal and again it is shown that the phase of the output is related to the distance to the surface. One advantage of the second embodiment is that the light emitting diodes are temperature sensitive and may not track well with changes in temperature when more than one LED is employed whereas, with a single LED, the variation in temperature does not affect the accuracy of the system.

Both of the embodiments utilize phase shifters and synchronous detectors which may add some undesirable complexity and cost to a system.

SUMMARY OF THE INVENTION

The present invention eliminates the need for phase shifters and synchronous detectors by, in the preferred embodiment, pulsing a light emitting diode and having the two detectors located at different distances receive the pulsed energy reflected from the surface during the pulse so as to build the detector output up to a peak value. The peak value reached by the closer detector will be greater than the peak reached by the more remote detector and when their outputs are then presented to decay circuit, such as a parallel resistor capacitor circuit, they will decay at different rates. When the values for the decay circuit associated with the larger peak voltage allows more rapid decay of the larger signal, there will be a point, during the decay, where the values of the two outputs are equal and I have determined that the time between the start of the decay and this point of equality is related to the distance to the remote surface. In the preferred embodiment this time may be used to drive the object lens of a camera to the proper focus position but the time may also be used to drive an indicator to indicate the distance to the remote surface. I have also found that an additional advantage that accrues from the use of the present invention with an autofocus camera in that the output varies with the distance to the remote object in a relationship that is very similar to the relationship between the lens extension and the proper focus position of the camera. Thus, the lens may be driven in a linear manner which is very advantageous in camera focus equipment since there need be no microprocessor or similar device to characterize the output in order to make it drive the camera lens.

BRIEF DESCRIPTION OF THE DRAWINGS

FIG. 1 shows a schematic diagram of a preferred embodiment of the present invention;

FIG. 2 is a graph showing the build up and decay of the signal from the output of the detectors of FIG. 1;

FIG. 3 is a graph showing the relationship between the extension of a camera lens and the output of the system of FIG. 1; and FIG. 4 is a showing of a simple lens moving mechanism utilizing the output of the present invention to focus the lens of a camera; and FIG. 5 is a schematic diagram of a meter utilizing the output of the present invention.

DETAILED DESCRIPTION OF THE PREFERRED EMBODIMENT

In FIG. 1 a light emitting diode 10 is shown emitting a beam of radiation such as infrared radiation along paths such as shown by lines 12 and 14. An opaque baffle 16 with a first aperture 18 therein restricts the radiation to a predetermined angle. The radiation from LED 10 will thus strike a remote surface or object 20 to form a spot of light or energy between the limits shown as points 22 and 24 on the remote surface. It is preferrable that the surface 20 be at least partly diffuse so that reflected energy from the spot comes off at various angles which would not be the case if the surface were totally specular.

A first detector D1 identified by reference numeral 30 is shown in FIG. 1 at a distance R from the surface 20 and receiving energy therefrom along lines shown as dashed lines 32 and 34. The baffle 16 has a second aperture 38 therein which is wide enough to allow reflected energy to reach detector 30 from an area between points 26 and 28 which includes at least the entire spot between points 22 and 24 for all through the range of the system. In other words, detector 30 can "see" the entire spot on object 20 produced by the LED 10 even though the spot changes position relative to the lines 32 and 34 as the surface assumes different ranges.

A second detector D2 identified by reference numeral 40 is shown mounted a distance L further away from surface 20 than detector 30 and receives reflected radiation from surface 20 along paths shown by dashed lines 42 and 44. It should be noted that, while in FIG. 1, I have shown detector 40 physically mounted to a distance L more remote from surface 20 than detector 30, lenses could be used with either or both detectors and the difference between their image positions would constitute the distance L. By properly choosing the focal lengths of such lens or lenses, both detectors could be physically positioned the same distance from surface 20 which would be advantageous when the size of the housing was needed to be small. Accordingly herein, the distance L should be considered an optical distance and not necessarily a physical distance. A third aperture 48 in the baffle 16 allows detector 40 to "see" the entire spot between points 22 and 24 produced by LED 10 for all ranges of the object the same as detector 30. While in FIG. 1 the area "seen" by both detectors 30 and 40 is the same (between points 26 and 28) this is not usually the case but since background illumination is removed by the system, it does not matter as long as both detectors "see" the whole spot between points 22 and 24.

A drive circuit 50, which may include a one shot multivibrator (for example, a 7465123 sold by National Semiconductor Inc.), produces a pulse on an output 52 connected to drive the LED 10. The duration of the pulse on output 52 may be any desired short period of time, but in the preferred embodiment a 20 microsecond pulse has been found to be satisfactory. Accordingly, the output of LED 10 would be a beam of energy producing a spot on surface 20 for a short period of time and detectors 30 and 40 receiving the reflected energy will produce outputs on lines 54 and 56 respectively, which outputs relate to the amount of energy or flux received by reflection from surface 20 which, in turn, relates to the distance to the remote object. Since detector 30 is closer to surface 20 than detector 40, it will receive more radiation flux and the output on line 54 will build up to a higher value during the pulse from LED 10 than will the output on line 56. The build up of output on the lines 54 and 56 from detectors 30 and 40 respectively can be seen in FIG. 2 by the curves 60 and 62 respectively occurring between time T1 and T2 in the graph. Curve 60 represents the build up on line 54 from closer detector 30 and is shown to produce a voltage V1 at time T2. Curve 62 represents the voltage on line 56 from further detector 40 and it is shown to produce a voltage V2, smaller than V1, at the same time T2.

Referring again to FIG. 1, the outputs on lines 54 and 56 are presented to capacitors 60 and 62 to remove any dc signals present in the detector outputs such as from ambient radiation. These signals are then amplified by amplifiers 64 and 66 and presented to apparatus for storing the peak signal such as sample circuits 70 and 72 respectively. One simple form of the sample circuits 70 and 72 may be a diode which is directed to permit signal flow from amplifiers 64 and 66 while the signal is building during the pulse, but to prevent reverse flow to the amplifiers when the pulse ceases. Another example is to use a sample-and-hold circuit so as to store the signal from amplifiers 64 and 66 and, at the disired time, e.g., the end of the pulse, trigger the sample-and-hold circuits to release the built up signal to the down stream apparatus. To this end, circuits 70 and 72 are shown connected to receive triggering signals from the drive circuit 50 over connections shown as dashed lines 74 and 76 respectively. The signals on the lines 74 and 76 will come from the drive circuit, for example the one shot multivibrator, preferably a the end of the 20 microsecond pulse presented to the LED 10 and will cause the circuits 70 and 76 to sample and present the peak value of voltage which was present from amplifiers 64 and 66 respectively at time T2 on output lines 80 and 82 respectively. The magnitude of voltage V1 may be, in the present example, about 1.04 volts while the voltage V2 may be, in the present example, about 1.00 volts for a case when R is about 1 meter and L is about 20 millimeters.

Capacitors 84 and 86 are shown in FIG. 1 connected between lines 80 and 82 and signal ground respectively. Resistors 88 and 90 are also shown in FIG. 1 connected between the outputs 80 and 82 and signal ground so as to be in parallel with capacitors 86 and 88. The capacitor resistor combinations form two decay circuits that receive the outputs and allow them to decay at a rate which depends on the size of the resistors and capacitors. For example, if capacitors 84 and 86 were both 1,000 pico-farads while resistor 88 was 500 kilohms and resistor 90 was one megohm, the decay from the signals on lines 80 and 82 would appear as shown in FIG. 2 along lines 94 and 96. It is seen that the rate of decay along 94 is greater than that than along line 96 by virtue of the smaller resistance of resistor 88 than resistor 90 but since the voltage from sample circuit 70 was greater than that from sample circuit 72, line 94 starts at a higher value. Accordingly, at some time T3 after the decay has started, the two voltages will become equal and the two curves will cross at a point 98 and will thereafter continue to decay until further voltage is applied. It should be noted that the curves of FIG. 2 have been compressed for clarity and actually, point 98 would normally be far further to the right than shown. More particularly, with the time between T1 and T2 being about 20 microseconds, the time between T2 and T3 might be more like 1000 microseconds. As will be shown, the time T between times T2 and T3 is related to the distance R to the surface 20 and the distance L which is constant. When the system is used to control the position of an element such as a camera lens, a single output pulse indicative of T may be all that is required and the next signal 1 from LED 10 need not be applied until a new position of the element is needed. In other situations as, for example, when driving an indicator, a continuous output may be desired. In such event, LED 10 may be triggered to pulse a new beam of energy as soon as the crossover point 98 (where the signals shown by lines 94 and 96 reverse, polarity) is reached. This is shown in FIG. 2 as occurring at time T3 by signal build up lines 60' and 62' followed by decay lines 94' and 96' and then again at a new crossover point 98' by build up lines 60" and 62" and decay lines 94" and 96", etc.

The decaying voltage on line 80 is presented to a first input of a comparator 100 and the decaying voltage on line 82 is presented to a second input of comparator 100. Comparator 100 compares the magnitude of the two inputs and produces an output, related to the time T when the two voltages on lines 80 and 82 change relative polarity. This time signal is presented from comparator 100 to a controller 110 along line 112. The controller 110 may also operate to produce a feedback signal on a connection shown as dashed line 114 in order to drive circuit 50 to trigger another pulse of radiation from LED 10 when a continuous output is desired. In either case, the output of the controller is a signal which is related to the time T and thus, as will be shown, to the distance to the surface 20. This output signal is presented on a line 116 to an output device 118 which may be a downstream indicator to indicate the distance to the remote surface or a control circuit for automated equipment such as a robot arm or the lens of a camera.

If the drive circuit 50 produces a series of successive pulses so that detectors D1 and D2 continually charge up to their peaks and then back to the crossover points 98, 98', 98", etc, then in FIG. 2, the output from the controller 10 will be frequency related to time T over the period during which the drive is operating. More particularly, it is seen that as T increases in FIG. 2 (indicative of R being less), the output frequency will increase while as T decreases (indicative of R being greater) the frequency is related to the inverse of T and, as will be shown, T is related to the inverse of R. Thus, frequency is directly related to R so that the output device 118 merely has to include a frequency to voltage converter in order to position an indicator directly.

Such a circuit is shown in FIG. 5 where a frequency to voltage converter 136 is shown receiving the signal from line 116 of FIG. 1 and producing an output on a line 138 to a voltage responsive meter 140. If the system operates only once to produce a single output pulse on line 116 indicative of T, such a signal can be used to control the position of an object such as the camera lens as will be described below in connection with FIG. 4. In this latter case, the feedback signal represented by dashed line 114 of FIG. 1 would not be required. The single pulse related to T is advantageous in camera lens positioning because, as explained, T is related to the inverse of R and so is the lens extension necessary for proper focus, this will be further explained below.

If "E" is the irradiance of the spot between points 22 and 24 on surface 20, "p" is the reflectivity of the surface 20, "a" is the area of the detectors 30 and 40, and "A" is the spot size area on surface 20 between points 22 and 24, the output from detector 30 will be:

$$V1 = EpaA/\pi R^2 \tag{1}$$

while the output from detector 40 will be:

$$V2 = EpaA/\pi(R+L)^2 \tag{2}$$

p For simplicity we can define:

$$K = EpaA/\pi \tag{3}$$

so that equation (1) becomes:

$$V1 = K/R^2 \tag{4}$$

and equation 2 becomes:

$$V2 = K/(R+L)^2 \tag{5}$$

At this point it should be noted that if V1 and V2 are divided, k drops out and a non-linear relationship for R is obtaind. Thus if desired, the values V1 and V2 could be presented to a computer which would ratio them so as to produce an output indicatiove of R, of course, the computer could also characterize the output to make it linear. However, in the preferred embodiment of the invention, I prefer to simplify and reduce the cost associated with the use of a computer. If capacitor 84 is identified as C1 and resistor 88 as R1 and capacitor 86 is identified as C2 and resistor 90 as R2, the decay voltages will be given by the equations:

$$V1' = V1 e^{-(\frac{t}{R1C1})} \tag{6}$$

and:

$$V2' = V2 e^{-(\frac{t}{R2C2})} \tag{7}$$

where t is the decay time and e the natural logarithm base. At the time T3 when the decaying voltages V1' and V2' are equal then:

$$V1 e^{-(\frac{T}{R1C1})} = V2 e^{-(\frac{T}{R2C2})} \tag{8}$$

Dividing V1 by V2:

$$\frac{V1}{V2} = \frac{e^{-(\frac{T}{R2C2})}}{e^{-(\frac{T}{R1C1})}} = e^{-T(\frac{1}{R2C2} - \frac{1}{R1C1})} \tag{9}$$

and substituting equations (4) and (5) into (9):

$$\frac{(R+L)^2}{R^2} = e^{-T(\frac{1}{R2C2} - \frac{1}{R1C1})} \tag{10}$$

Now since the resistors and capacitors are constant, let us define:

$$q = \left(\frac{1}{R2C2} - \frac{1}{R1C1}\right) \tag{11}$$

wherein it should be noted that q is determined by the time constants of the decay circuits and will be negative because R1C1 is smaller than R2C2.

Then, equation (10) becomes:

$$\frac{(R+L)^2}{R^2} = e^{-Tq} \tag{12}$$

which can be rewritten:

$$\frac{R+L}{R} = e^{-Tq/2} \tag{13}$$

and again simplifying:

$$L/R = e^{-Tq/2} - 1 \tag{14}$$

Expanding the expression $e^{-Tq/2}$ as a series we obtain:

$$\frac{L}{R} = 1 - Tq/2 + \frac{T^2q^2}{2!4} - \frac{T^3q^3}{3!8} - 1 \tag{15}$$

The value of this is nearly equal to the first two terms and accordingly it can be said that:

$$L/R \cong -T q/2 \tag{16}$$

Remembering that q is a constant and has a negative value, it is seen that:

$$T \cong KL/R \tag{17}$$

where K=−2/q it is therefore seen that the range to the surface varies inversely with the time T.

A plot of the range to the surface R against the time T is found in FIG. 3 where I have assumed the value for q of −16. It can be seen that the distance to the surface in millimeters varies with the time in milliseconds along a curve 120. The shape of curve 120 is very similar to the relationship for the lens extension of a camera which is given by:

$$\text{Extension} = \frac{f^2}{s-f} \tag{18}$$

where f is the lens focal length and s is the surface distance corresponding to R in FIG. 1. This curve is plotted in FIG. 3 along a line 122 when it has been assumed that the focal length f is 50 millimeters. It can be seen that the two curves are almost identical and, accordingly, the output, which is related to T, can be used to control the position of a lens directly and linearly without any characterization or computer programming that has been necessary in prior art devices.

A system for positioning a lens is shown in FIG. 4. In FIG. 4 a lens 150, which may be the taking lens of a camera, is shown mounted on or connected to a member 152 having a sawtooth lower surface 154. Member 152 is urged to the left by a spring or other biasing member 160 connected to a housing 162. Member 152 is restrained from motion to the left by an L-shaped pivotable member 164. L-shaped member 164 is moveable in a counterclockwise direction around a pivot point 166 by the action of a solenoid 170 having an input 176 which may be connected to the drive 50 so as to receive a signal from the one shot multivibrator at time T2 when the LED 10 has pulsed. While time T is shown measured between times T2 and T3, the time between T1 and T2 is so short compared to the time between T2 and T3 that for practical purposes the signal to output 176 could be at T1, T2, or any time therebetween without effecting the accuracy of the system. A signal on input 176 will activate solenoid 170 to rotate member 164 and thus release member 152 to move to the left under the bias of spring 160. Lens 150 connected to member 152 will thus move in the direction of arrow 180 starting at the time T3.

A stopping member in the form of a wedge 184 is connected to a second solenoid 186 which has an input 188 for receiving the output signal from comparator 100 on line 112 at the time when the two curves of FIG. 2 have decayed to the point 98, i.e., time T3. When a signal is presented to terminal 188, the wedge 184 will move upwardly to engage one of the sawtooth portions of member 152 and stop the motion of member 152 and lens 150. A linearity device which may be a geneva mechanism shown as box 190 is connected to the lens 150 and member 152 by a connection shown as dashed line 192 and operates to allow the lens 150 to move to the left at a linear rate rather than an accelerated rate as would be normally caused by spring 160.

Because the time between the starting of motion of member 152 by solenoid 170 and the stopping of motion by solenoid 186 is equivalent to T in equation (17) and since the motion of lens 150 has been linear, lens 50 will be moved to a position which produces a focus condition for the remote object 20 on a film plane (not shown). This is true because the extension of lens 150 will follow a curve like 122 in FIG. 3 which is so closely associated with the distance to the surface as compared to the time T along line 120.

It is possible that the system described above in the preferred embodiment could be operated in reverse with two light emitting diodes and a single detector somewhat similar to the first embodiment of the above-mentioned co-pending application but this would involve distinguishing or characterizing the radiation from the two sources so that they would be separately useable and further re-introduce the problem of having the light emitting diodes decay differently with temeperature variations. Accordingly it is preferred that the single LED and dual detectors described herein be utilized.

It should also be appreciated that while two detectors are used in the preferred embodiment, one detector could be used if movable apparatus were employed to change the optical distance of each detector. For example, if a first pulse of radiation were detected at a first position and the signal therefrom stored and then the optical distance to the detector was changed by moving the detector or introducing a lens, a second pulse of radiation could then be detected and the resulting signal stored. The two stored signals could then be compared as disclosed herein to produce a resultant signal which was a function of T and thus of the distance to the remote object.

It is obvious that many changes can be made to the structure shown in the preferred embodiment as, for example, the drive mechanism for the lens in FIG. 4 can take many alternate forms using gear drives and the like. Also, as mentioned above, the output rather than controlling a remote device such as a camera may be used to control the position of an indicator. Likewise, various drive cuircuits, sample circuits, and delay circuits may be employed and, accordingly, I do not wish to be limited to the disclosures used in connection with the description of the preferred embodiments but intend only to be limited by the following claims:

The embodiments of the invention in which an exclusive property or right is claimed are defined as follows:

1. Range determining apparatus comprising:
   energy producing means for directing a pulse of energy to a remote surface to form a spot of energy thereon;
   first energy responsive means positioned an unknown distance from the surface to receive energy reflected from at least the entire spot and to produce a first output which increases to a first value indicative of the energy received by the first energy responsive means during a first time period;
   second energy responsive means positioned a predetermined optical distance further from the surface than the first energy responsive means to receive energy reflected from at least the entire spot and to produce a second output which increases to a second value indicative of the energy received by the second energy responsive means during the first time period;
   first decay means connected to the first energy responsive means to receive the first output;
   second decay means connected to the second energy responsive means to receive the second output; and
   comparing means connected to the first and second decay means and operable to produce a third output indicative of a second time period which is a function of the relative time needed for the first and second outputs to decay to an equal value, the second time period being a function of the unknown distance.

2. Apparatus according to claim 1 wherein the first and second decay means are chosen to permit more rapid decay of the first output than the second output.

3. Apparatus according to claim 2 wherein the first and second decay means are first and second RC networks and the second RC network is larger than the first RC network.

4. Apparatus according to claim 1 wherein the pulse of energy has a duration equal to the first time period.

5. Apparatus according to claim 1 further including movable mean connected to receive the third output and operable in accordance therewith to move to a position indicative of the uknown distance.

6. Apparatus according to claim 5 wherein the movable means includes camera lens means which moves to a proper focus position in accordance with the third output.

7. Apparatus according to claim 6 wherein the third time period is an inverse function of the unknown distance and the camera lens means moves to the proper focus position as a direct function of the third time period.

8. Apparatus according to claim 7 further including linear means conencted to the camera lens means so that the movement is linear.

9. Apparatus according to claim 1 further including feedback means connected from the comparing means to the energy producing means to cause the energy producing means to produce further pulses of energy and the end of each successive second time period, the frequency of the third output being a direct function of the unknown distance.

10. Apparatus according to claim 9 further including output means responsive to the frequency of the third output to indicate the unknown distance.

11. Apparatus according to claim 10 wherein the output means includes a frequency voltage converter and a voltage responsive meter.

12. Apparatus according to claim 1 further including a first means limiting the directed pulse of energy to a first predetermined angle.

13. Apparatus according to claim 11 further including second and third means limiting the reflected energy received by the first and second energy responsive means to second and third predetermined angles respectively.

14. Apparatus according to claim 11 wherein the first means comprises an opaque member having a first aperture through which the pulse of energy is directed.

15. Apparatus according to claim 13 wherein the second and third means comprises an opaque member having second and third apertures through which the reflected energy is received by the first and second energy responsive detectors respectively.

16. Apparatus for determining the distance to a remote object comprising:
    radiation transmission means operable to transmit a pulsed beam of radiation to the remote object to form a spot of radiation thereon;
    radiation detector means positioned to receive radiation reflected from the complete spot and operable to produce first and second output signals respectively indicative of the radiation received at first and second optical distances from the remote object;
    signal decay means connected to receive the first and second output signals respectively and at a first time, to permit decay of the first and second output signals at different rates; and
    comparison means connected to receive the decaying first and second output signals and to produce a resultant signal at a second time when the decaying first and second output signals change relative polarity, the time between the first and second times being indicative of the distance to the remote surface.

17. Apparatus according to claim 16 further including camera lens means connected to receive the resultant signal and movable in accordance therewith to a position of proper focus.

18. Apparatus according to claim 17 further including linear means connected to the camera lens means to assure the movement is linear.

19. Apparatus according to claim 16 further including feedback means connected between the comparison means and the radiation transmission means to provide a feedback signal to trigger the radiation transmission means to produce successive pulses of radiation to the remote surface each time the first and second decaying output signals change relative polarity so that the frequency of the resultant signal is indicative of the distance to the remote surface.

20. Apparatus according to claim 19 further including indicator means connected to the comparison means to receive the resultant signal and indicate the distance to the remote object.

21. Apparatus according to claim 20 wherein the indicator means includes a frequency to voltage converter.

22. Apparatus according to claim 16 wherein the distance to the remote object is R, the difference between the first and second optical distances is L, the difference between the first and second times is T, and $T \simeq KL/R$ where R is a constant determined by the time constants of the decay means.

23. Apparatus according to claim 22 wherein the decay means comprises first and second resistance-capacitance circuits and K is determined by the value of the resistance and capacitance of the decay means.

24. Apparatus according to claim 23 wherein the resistances of the first and second resistance-capacitance circuits is R1 and R2 respectively, the capacitances of the first and second resistance-capacitance circuits is C1 and C2 respectively, and K is given by 2/q where $$q = \left( \frac{1}{R2C2} - \frac{1}{R1C1} \right)$$

25. The method of determining the distance to a remote object comprising the steps of:
    A. directing a beam of radiant energy to the remote object to form a spot of radiation thereon;
    B. detecting radiation reflected from the spot at a first optical distance and producing a first output signal in accordance therewith;
    C. detecting radiation reflected from the spot at a second optical distance and producing a second output signal in accordance therewith;
    D. at a first time causing the first and second output signals to decay at different rates so that the larger output signal decays at a greater rate causing the decaying larger output signal to equal the decaying smaller output signal at a second time; and
    E. producing a resultant output as a function of the time period between the first and second times as a determination of the distance to the remote object.

26. The method of claim 23 further including the step of:
    F. applying the resultant output to a motive means so as to position a member at a position which is a function of the distance to the remote object.

27. The method of claim 23 further including the step of:
    F. applying the resultant output to a camera so as to position the taking lens thereof at a proper focus position.

* * * * *